United States Patent
Takagi et al.

(10) Patent No.: US 7,777,950 B2
(45) Date of Patent: Aug. 17, 2010

(54) STEREOSCOPIC IMAGE DISPLAY APPARATUS

(75) Inventors: Ayako Takagi, Yokosuka (JP); Yuzo Hirayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 212 days.

(21) Appl. No.: 12/051,588

(22) Filed: Mar. 19, 2008

(65) Prior Publication Data

US 2009/0052026 A1    Feb. 26, 2009

(30) Foreign Application Priority Data

Mar. 20, 2007    (JP) .............................. 2007-072072

(51) Int. Cl.
*G02B 27/22* (2006.01)
(52) U.S. Cl. ........................... 359/463; 348/58; 348/59; 359/465
(58) Field of Classification Search .................. None
See application file for complete search history.

(56) References Cited

U.S. PATENT DOCUMENTS

| | | | |
|---|---|---|---|
| 7,058,252 B2 * | 6/2006 | Woodgate et al. ............. 385/16 |
| 2004/0222945 A1 | 11/2004 | Taira et al. |
| 2006/0256259 A1 | 11/2006 | Takagi et al. |
| 2007/0035672 A1 * | 2/2007 | Shestak et al. ................ 349/15 |
| 2007/0146234 A1 | 6/2007 | Taira et al. |
| 2008/0211736 A1 | 9/2008 | Taira et al. |
| 2010/0027115 A1 * | 2/2010 | De Boer et al. ............. 359/463 |

FOREIGN PATENT DOCUMENTS

| | | |
|---|---|---|
| CN | 1525243 A | 9/2004 |
| JP | 2000-503424 | 3/2000 |
| WO | WO 98/21620 A1 | 5/1998 |
| WO | WO 03/015424 A2 | 2/2003 |

OTHER PUBLICATIONS

Yoshino; "The Foundation of Liquid Crystal and Display Application", Corona Publishing Co., Ltd., pp. 43-44.

* cited by examiner

*Primary Examiner*—Lee Fineman
(74) *Attorney, Agent, or Firm*—Finnegan, Henderson, Farabow, Garrett & Dunner, L.L.P.

(57) ABSTRACT

It is made possible to provide a stereoscopic image display apparatus capable of preventing the stereoscopic display characteristics from being degraded even if the locus of light rays between the lens and the two-dimensional display device becomes long. A stereoscopic image display apparatus includes: a plane display device having a display face formed of a plurality of pixels arranged in a matrix form; an optical plate comprising a plurality of lenses which are arranged in front of the display face of the plane display device and which have a uniaxial double refractive material inserted therein, and controlling light rays from the pixels; and a sheet polarizer provided between the plane display device and the optical plate to align a polarization direction of light ray. In the double refractive material, a maximum primary axis of refractive index is parallel to ridgelines of the lenses and is inclined in a direction opposed to a viewer.

8 Claims, 9 Drawing Sheets

STEREOSCOPIC IMAGE DISPLAY APPARATUS

CROSS-REFERENCE TO RELATED APPLICATION

This application is based upon and claims the benefit of priority from prior Japanese Patent Application No. 2007-72072 filed on Mar. 20, 2007 in Japan, the entire contents of which are incorporated herein by reference.

BACKGROUND OF THE INVENTION

1. Field of the Invention

The present invention relates to a stereoscopic image display apparatus which displays a stereoscopic image.

2. Related Art

A method of recording a stereoscopic image by using some method and reproducing it as a stereoscopic image is known. This method is called integral photography (hereafter referred to as IP method as well) or light ray reproduction method, and a large number of parallax images are displayed in this method. It is supposed that an object is viewed with left and right eyes. When a point A located at a short distance is viewed, an angle formed by the point A and the left and right eyes is denoted by $\alpha$. When a point B located at a long distance is viewed, an angle formed by the point B and the left and right eyes is denoted by $\beta$. The angles $\alpha$ and $\beta$ vary depending upon the position relation between the substance and the viewer. The difference $(\alpha-\beta)$ is called binocular parallax. Human being is sensitive to the binocular parallax and is able to conduct stereoscopic viewing.

In recent years, development of stereoscopic image display apparatuses without glasses has been promoted. Many of them are made possible by using the ordinary two-dimensional plane display device (for example, a liquid crystal display device), placing an optical plate formed of a lenticular lens or a slit on the front or back of the plane display device, utilizing the binocular parallax described above, and controlling angles of light rays from the plane display device so as to cause light rays to appear to be illuminated from objects located several cm before and behind the plane display device when viewed by a viewer. This is because it has become possible to obtain an image which is high in definition to some degree even if light rays of the plane display device are distributed to several kinds of angles (called parallaxes), owing to implementation of the two-dimensional display device having a higher definition. A three-dimensional (hereafter referred to as 3D as well) display method implemented by thus applying the IP method to the plane display device is called II (integral imaging) scheme. In the II scheme, the number of light rays illuminated from one lens corresponds to the number of element image groups. The number of the element image groups is typically called number of parallaxes. In each lens, parallax rays are illuminated in parallel.

In the II scheme, the viewer views different images: $\gamma$ which is an image of 1 parallax, $\beta$ which is an image of 2 parallaxes, and $\alpha$ which is an image of 3 parallaxes, according to the position of the viewer or the angle at which the viewer views. Therefore, the viewer perceives a solid body by parallax between the right eye and the left eye. If a lenticular lens is used as the optical plate, there is a merit that the display is bright because the utilization efficiency of light is high as compared with a slit.

In general, a liquid crystal display device is frequently used as a plane display device used in a stereoscopic image display apparatus. Fundamental properties concerning propagation of light in liquid crystal are described in, for example, "The foundation of liquid crystal and display application" written by Katsumi Yoshino and published by CORONA PUBLISHING CO., LTD., pp. 43-44. Hereafter, the fundamental properties will be described briefly. In the liquid crystal, each molecule takes a long and slender shape. Anisotropy of the refractive index occurs in a lengthwise direction of the molecule called director. For example, many of molecules in nematic liquid crystal are long and slender molecules. Their major axis directions are aligned and oriented. However, position relations of the molecules are random. Even if the orientation directions of molecules are in alignment, the absolute temperature is not zero degree, and consequently they are not perfectly parallel and there is fluctuation to some degree. Viewing a local region, it can be said that molecules are aligned in nearly one direction. When a region which is small enough macroscopically but large enough as compared with the size of the liquid crystal molecules is supposed, the average orientation direction of the molecules in that region is represented by using a unit vector, and it is referred to as director or orientation vector. An orientation in which the director becomes nearly parallel to the substrate is referred to as homogeneous orientation.

It is supposed that light is incident on optically uniaxial liquid crystal so as to have a propagation direction which forms an angle of $\theta$ with the optic axis. In a part which is outside of a medium and which has an isotropic refractive index of $n_o$, light propagates in a direction perpendicular to the wavefront. In the medium as well, an ordinary ray propagates in the normal line direction of the wavefront in the same way as the outside of the medium. As for an extraordinary ray, however, its energy propagation direction in the medium becomes a direction of $\phi$ with respect to the optic axis. In the medium plane, therefore, light propagates in a direction of $\theta-\phi$ which is the direction of polarization. In other words, in the medium, the ordinary ray and the extraordinary ray which are orthogonal to each other in polarization direction propagate in different directions.

Furthermore, one of the greatest features of liquid crystal is optical anisotropy. Especially, since the degree of freedom in the molecule arrangement is high as compared with other anisotropic media such as crystal, the difference in refractive index between the major axis and the minor axis which is a criterion of double refraction is great.

As described in WO 2003/015424A1, there is a two-dimensional image/three-dimensional image changeover display device in which the effect of the lens is electrically lost by adding means which controls anisotropic lens and the polarization direction to a plane display device. A substance having the double refraction property is put into a lens, and an isotropic substance is put into an opposite position. As a result, light rays in a direction having a refractive index difference are converged by the lens, and light rays in a direction having no refractive index difference form a two-dimensional image. In the WO 2003/015424A1, however, a method for preventing three-dimensional image display from being degraded with respect to an angle at which the viewer views in a lens ridgeline direction is not described.

A stereoscopic image display apparatus disclosed in JP-A No. 2000-503424 (KOKAI) includes a display device (for example, a matrix type liquid crystal display panel) having a display face formed of pixels arranged in a matrix form, and lenticular means which is disposed on the output side of the display device, which has an array of lenticular elements passing through outputs of various pixels, which forms at least one stereoscopic view, and which causes the stereoscopic views to be visible to respective eyes of the viewer. In this stereoscopic image display device, the lenticular means contains an electrooptic material having an electrically variable refractive index, and a high resolution two-dimensional image can be displayed by selectively switching the refractive indexes so as to remove the action of the lenticular elements. In JP-A No. 2000-503424 (KOKAI), however, a method for preventing three-dimensional image display from being degraded with respect to an angle at which the viewer views in a lens ridgeline direction is not described.

In a stereoscopic image display apparatus obtained by utilizing one-dimensional integral imaging scheme in a stereoscopic image display apparatus, lights rays of a three-dimensional image are controlled only in the lateral direction of the viewer, i.e., ridgelines of a plurality of lens arrays are placed in the longitudinal direction and light rays are controlled only in the lateral parallax direction. It is now supposed that the viewer watches a stereoscopic image display apparatus in a standing posture when the stereoscopic image display apparatus is large and the view angle range is wide and consequently the depression angle changes according to the person's height. In other words, it is supposed that a plane image display apparatus is placed on a desk and the viewer views the display screen in a depression angle direction. Since the viewer views the stereoscopic image display apparatus not only from the front but also from obliquely above, a gap (distance) between a lens face used as an optical plate of the stereoscopic image display apparatus and a plane display device disposed at the back of the lens to display an elemental image becomes longer as compared with the display face is viewed from the front. Therefore, the gap becomes greater than the focal length of the lens, and the crosstalk increases, resulting in a problem that a viewing angle at which a favorable three-dimensional image can be viewed decreases.

On the other hand, if the gap between the lens and the plane display device located behind the lens in the stereoscopic image display apparatus is made nearly equal to the focal length, a favorable stereoscopic image in which adjacent elemental images are not mixed is obtained when the stereoscopic image display apparatus is viewed from the viewer's side.

SUMMARY OF THE INVENTION

The present invention has been made in view of these circumstances, and an object of thereof is to provide a stereoscopic image display apparatus capable of preventing the stereoscopic display characteristics from being degraded even if the locus of light rays between the lens and the two-dimensional display device becomes long.

A stereoscopic image display apparatus according to an aspect of the present invention includes: a plane display device having a display face formed of a plurality of pixels arranged in a matrix form; an optical plate comprising a plurality of lenses which are arranged in front of the display face of the plane display device and which have a uniaxial double refractive material inserted therein, and controlling light rays from the pixels; and a sheet polarizer provided between the plane display device and the optical plate to align a polarization direction of light ray, wherein in the double refractive material, a maximum primary axis of refractive index is parallel to ridgelines of the lenses and is inclined in a direction opposed to a viewer.

DESCRIPTION OF THE EMBODIMENTS

Hereafter, embodiments of the present invention will be described with reference to the drawings.

First Embodiment

Figure 1:
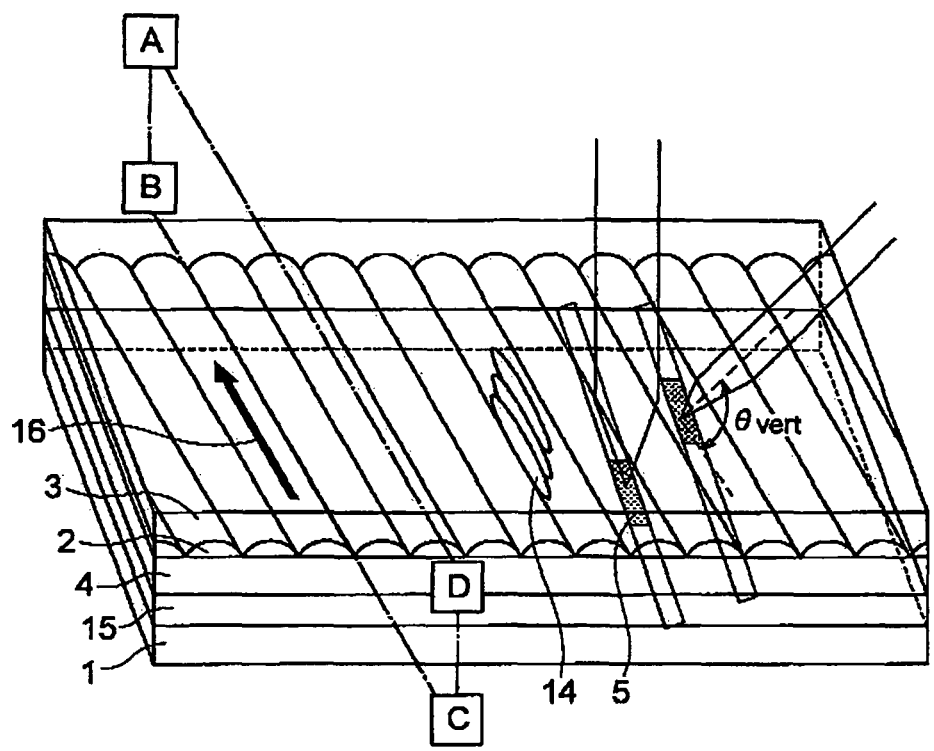
FIG. 1 is an oblique view showing a stereoscopic image display apparatus according to a first embodiment of the present invention.

A stereoscopic image display apparatus according to a first embodiment of the present invention is shown in FIG. 1. A section of the stereoscopic image display apparatus according to the present embodiment obtained along a cutting plane ABCD is shown in FIG. 1.

The stereoscopic image display apparatus according to the present embodiment includes a plane display device 1 formed of, for example, a liquid crystal display placed horizontally. A retardation film 15 is provided on the plane display device 1. A transparent substrate 4 is provided on the retardation film 15. A uniaxial double refractive material 2 is placed on the substrate 4. The upside of the double refractive material 2 is covered by a lens array 3. In other words, the double refractive material 2 has a configuration that it is inserted between the substrate 4 and the lens array 3. The lens array 3, the double refractive material 2 and the substrate 4 constitute a double refraction lens array (optical plate).

As shown in FIG. 1, N is a refractive index of the medium 2 located inside a plano-convex lens, and n is a refractive index of the medium 3 located outside the lens array of piano-convex lenses. The plano-convex lens is a special case of the convexo-convex lens, and it is obtained by making the radius of curvature of the inside lens infinitely great. A focal length f of the plano-convex lens is represented by the following expression, where r1 is a radius of curvature of the plano-convex lens.

$$\frac{1}{f} = \frac{(N-n)}{r_1 n} \quad (1)$$

In the present embodiment, a ridgeline direction of the lens array 3 is made different from a column direction of pixels of the plane display device 1, and is inclined by some angle. This is one method used to take a measure against moiré. If a different method such as forming a black matrix which is a boundary of pixels obliquely is used, however, the ridgeline direction of the lens array 3 may be the same as the pixel direction. In addition, one face of lenses takes a convex shape on the viewer's side as shown in FIG. 1. Also in the case where one face of lenses takes a convex shape on a side opposite to the viewer's side, however, the focal length is represented by the expression (1). In both cases, the focal length is set so as to nearly coincide with the distance between a center part of a curved surface of the lens and the two-dimensional display device which displays an elemental image.

As for the plane display device 1, there are broadly two kinds. One kind includes liquid crystal displays such as the reflection type and the transmission type, whereas the other kind includes organic EL displays and plasma displays other than liquid crystal displays. The liquid crystal display has a sheet polarizer on its top face to control the gradation, and the polarization direction is already aligned. As for the retardation film 15, therefore, the transmission efficiency of light is high if a transparent film is placed to make polarization coincide with a maximum primary axis direction of the uniaxial double refractive material 2 disposed on the top face of the retardation film 15. As a typically known method, the polarization direction can be rotated by making the major axis direction of a λ/2 sheet coincide with a predetermined direction. If a display other than the LCD is used as a plane display device, then there is nothing which aligns the polarization on the top face, and it is necessary to place a sheet polarizer as the retardation film 15 and align its polarization direction with the maximum primary axis direction of the uniaxial double refractive material 2 placed on the sheet polarizer. Placing the sheet polarizer typically causes darkness. In the case of a display other than the LCD, therefore, it is necessary to make the brightness of the rear display brighter.

If the major axis direction is not aligned in the uniaxial double refractive material (for example, liquid crystal), then the refractive index does not become constant even if the polarization direction is aligned with the major axis direction. Supposing a configuration in which liquid crystal is sandwiched between the lens array 3 and the substrate 4, therefore, liquid crystal molecules can be arranged in the constant direction by conducting orientation processing respectively on opposed faces in contact with liquid crystal.

In the present embodiment, the plane display device 1 is placed horizontally. However, the plane display device 1 may be disposed vertically upright. In this case, the stereoscopic image display device according to the present embodiment is also disposed vertically upright.

As a first feature of the present embodiment, the major axis direction (maximum primary axis direction) of the uniaxial double refractive material 2 which forms the double refraction lens array 2, 3 and 4 is sometimes inclined in a direction opposed to the viewer. Its reason will now be described with reference to FIG. 2. It is known that a tilt angle $\theta_{tilt}$ (see FIG. 2) formed by the opposed substrate and the direction of the maximum primary axis of the liquid crystal can be controlled according to the kind of a film used as the orientation film of the liquid crystal. For example, if the liquid crystal orientation film material SUNEVER produced by Nissan Chemical Industries, Ltd. is used, the tilt angle can be controlled to some degree by utilizing an orientation film changed in composition. According to a design value indicated in a catalogue, the tilt angle of models SE410 and SE130 is as low as approximately 2 degrees. In SE150 and SE3310, the tilt angle is in the range of 4 to 5 degrees. In SE-610 and SE3510, the tilt angle is in the range of 7 to 8 degrees. If the material of the liquid crystal orientation film is thus adjusted, the tilt angle can be controlled within 10 degrees to some extent.

Figure 2:
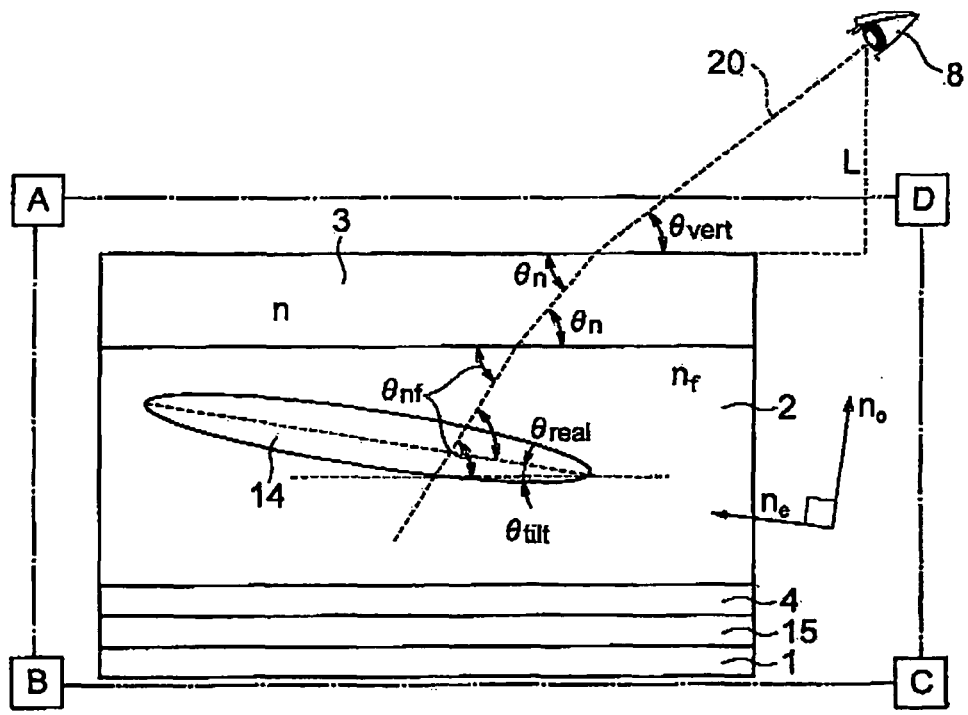
FIG. 2 is a sectional view of the stereoscopic image display apparatus according to the first embodiment.

FIG. 2 is a sectional view obtained by cutting using a plane ABCD shown in FIG. 1 formed along the ridgeline direction of the lens. As shown in FIG. 1, a polarization direction (a direction of an arrow 16 shown in FIG. 1) is aligned with the maximum primary axis of the double refractive material 2.

How the incident angle to the major axis direction of a liquid crystal molecule 14 in the double refractive material 2 changes when a depression angle $\theta_{vert}$ shown in FIG. 2 changes from 0 degree to 90 degrees will now be described. Since an incident light ray 20 from a viewer 8 enters the lens array 3 having an isotropy refractive index n from within the air at the depression angle $\theta_{vert}$, a depression angle at the double refractive material 2 becomes $\theta_n$. From the Snell's law, the following expression is obtained.

$$\sin(90-\theta_{vert}) \times 1 = \sin(90-\theta_n) \times n \quad \cos\theta_{vert} = \cos\theta_n \times n \quad (2)$$

It is appreciated that the depression angle $\theta_n$ obtained after passage through the lens array 3 becomes greater than the depression angle $\theta_{vert}$ from the viewer 8.

$$\theta_n = \arccos(\cos\theta_{vert}/n) \quad (3)$$

A light ray from the lens array 3 having the isotropy refractive index n is incident on the uniaxial double refractive material 2 having the refractive index $n_f$ at the depression angle $\theta_n$. An incident angle to the uniaxial double refractive material 2 having the refractive index $n_f$ is denoted by $\theta_{nf}$. The light ray is further refracted by the difference in refractive index.

$$\sin(90-\theta_n) \times n = \sin(90-\theta_{nf}) \times n_f \quad \cos\theta_{nf} = \cos\theta_n \times n/n_f$$

From the expression (2), the following expression is obtained.

$$\cos\theta_{nf} = \cos\theta_{vert}/n_f \quad (4)$$

If the major axis of the uniaxial double refractive material 2 has a tilt angle $\theta_{tilt}$ as shown in FIG. 2, then a depression angle $\theta_{real}$ of actual incidence with respect to a maximum primary axis of a liquid crystal molecule 14 becomes as follows:

$$\theta_{real} = \theta_{nf} + \theta_{tilt} \quad (5)$$

Since the refractive index of the uniaxial double refractive material 2 depends upon the incident angle $\theta_{real}$ to the liquid crystal molecule 14, the fact that the refractive index depends upon the depression angle is utilized in the embodiment. To be more precise, denoting the refractive index in the major axis direction of the uniaxial double refractive material 2 by $N_e$, the refractive index in the minor axis direction by $N_o$, and an angle formed by the major axis of the liquid crystal molecule 14 by $\theta_{real}$, the refractive index $N(\theta_{real})$ of the double refractive material 2 is represented by the following expression according to "The foundation of liquid crystal and display application" written by Katsumi Yoshino and published by CORONA PUBLISHING CO., LTD., pp. 43-44.

$$N(\theta_{real}) = \frac{N_e N_o}{\sqrt{N_e^2 \sin^2 \theta_{real} + N_o^2 \cos^2 \theta_{real}}} \quad (6)$$

Since the refractive index of the uniaxial double refractive material 2 is $n_f = N(\theta_{real})$, the following expression is obtained from the expressions (4), (5) and (6).

$$\cos \theta_{nf} = \cos \theta_{vert}/n_f = \cos \theta_{vert}/N(\theta_{real})\theta_{nf} = \arccos\{\cos \theta_{vert}/N(\theta_{real})\} \quad (7)$$

Since $\theta_{real}$ is approximately 90 degrees, it can be supposed that $N(\theta_{real}) = N_e$.

Figure 3:
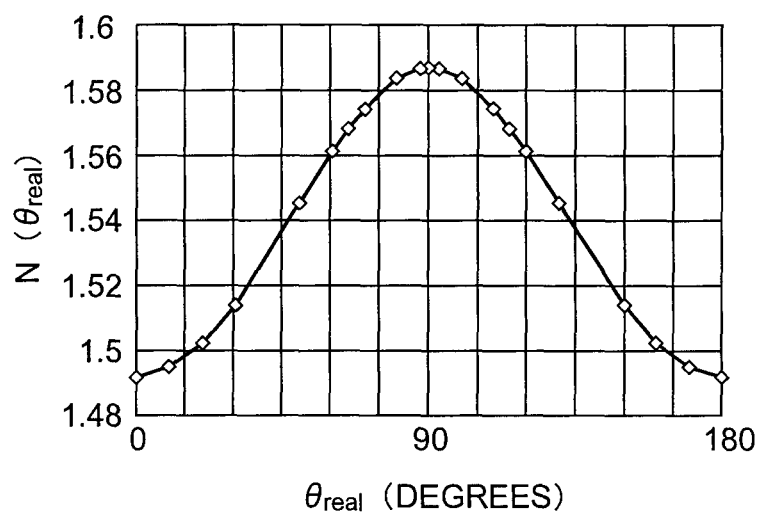
FIG. 3 is a diagram showing dependence of a double refraction index upon an incident angle.

For example, a result obtained by finding dependence of $N(\theta_{real})$ in the expression (6) upon $\theta_{real}$ on the supposition that the refractive index in the maximum major axis of the double refractive material $N_e = 1.587$ and the refractive index in the minor axis direction $N_o = 1.492$ is shown in FIG. 3. As shown in FIG. 3, $N(\theta_{real})$ becomes $N_e$ in the vicinity of $\theta_{real} = 90$ degrees and $N(\theta_{real})$ becomes $N_o$ in the vicinity of $\theta_{real} = 0$ degree.

How the refractive index in the double refractive material 2 changes when the depression angle $\theta_{vert}$ shown in FIG. 2 changes from 0 degree to 90 degrees will now be described.

As for the light ray which is incident nearly parallel to the outside boundary of the lens array 3, it follows that $\theta_n = 42$ degrees from the Snell's law if the incident angle $\theta_{vert}$ of the liquid crystal molecule is 0 degree and the refractive index of the isotropic substance 3 is $n = 1.495$. Therefore, the double refractive material 2 can assume a depression angle only in the range of $42 < \theta_n < 90$.

Figure 4:
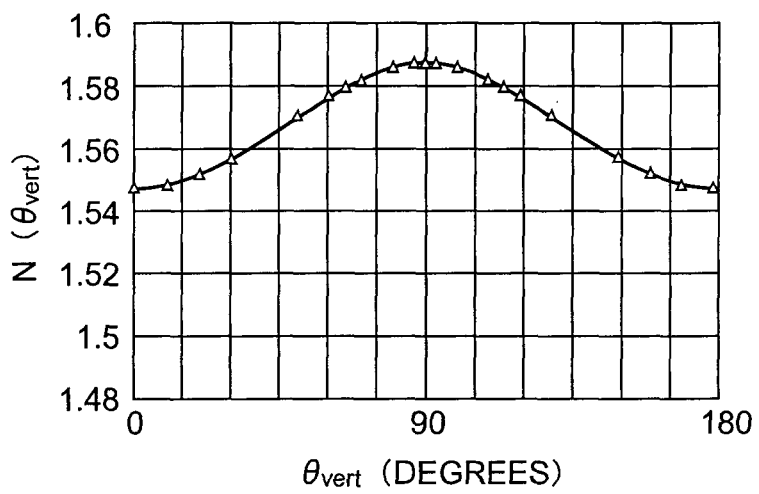
FIG. 4 is a diagram showing dependence of the double refraction index upon an angle incident on liquid crystal molecules.

(a) When $\theta_{tilt} = 0$ degree:

$N(\theta_{vert})$ of the lens array 3 caused by the depression angle $\theta_{vert}$ of the viewer 8 can be found from the expressions (4), (5) and (6). For example, a result obtained by finding dependence of $N(\theta_{vert})$ in the expression (6) upon $\theta_{vert}$ on the supposition that the refractive index in the maximum major axis of the double refractive material $N_e = 1.587$ and the refractive index in the minor axis direction $N_o = 1.492$ is shown in FIG. 4. As appreciated from FIG. 4, the refractive index of the uniaxial double refractive material 2 depending upon $\theta_{vert}$ lowers only to 1.548, but it does not lower to $N_o = 1.492$.

Dependence of a change rate of the refractive index upon the incident angle will now be described with reference to FIG. 3. The refractive index n of the isotropic substance of the outside lens array is set to a value which is nearly equal to $N_o$.

$$n(\theta_{real} = 90) = 1.587 \quad (8)$$

$$n(\theta_{real} = 80) = 1.585 \quad (9)$$

$$n(\theta_{real} = 70) = 1.575 \quad (10)$$

Comparing the expression (8) with the expression (9), a change rate in refractive index between 80 degrees and 90 degrees is very small as represented by $\{n(\theta_{real} = 90) - n(\theta_{real} = 80)\}/(N_e - N_o) = 0.02$. Comparing the expression (9) with the expression (10), however, a change rate in refractive index between 70 degrees and 80 degrees becomes $\{n(\theta_{real} = 80) - n(\theta_{real} = 70)\}/(N_e - N_o) = 0.105$. It is appreciated from the foregoing description that the change rate in refractive index between 80 degrees and 90 degrees is sufficiently small as compared with the change rate in refractive index between 70 degrees and 80 degrees. A part in which the change rate is small will be utilized this time.

Figure 5:
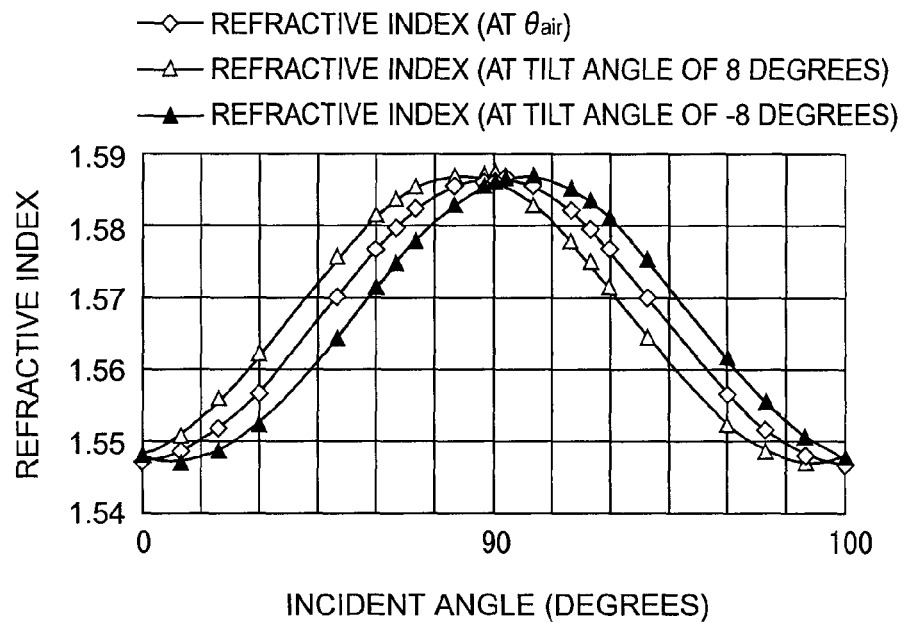
FIG. 5 is a diagram showing dependence of a refractive index of a double refractive material upon a depression angle.

(2) When $\theta_{tilt} = \pm 8$ degrees:

FIG. 5 shows dependence of the refractive index upon $\theta_{vert}$ obtained when the liquid crystal molecule is tilted by $\theta_{tilt}$. If the tilt angle $\theta_{tilt}$ is inclined by 8 degrees to the viewer 8 side, then $\theta_{vert}$ is in the range of 72 to 92 degrees in a region in which the change rate of the refractive index is within 2% as appreciated from FIG. 5. If the tilt angle $\theta_{tilt}$ is inclined by 8 degrees to the opposite side of the viewer 8, then $\theta_{vert}$ is in the range of 88 to 108 degrees in a region in which the change rate of the refractive index is within 2%.

If the depression angle becomes shallow, then the gap (distance between the lens surface and the elemental image) becomes long. An object of this time is to lengthen the focal length by utilizing a change of the refractive index of the double refractive lens according to the gap. Thereby, it is attempted to cause the gap to coincide with the focal length.

The increase rate of the focal length according to $\theta_{vert}$ becomes a differential component of a curve shown in FIG. 5. It is appreciated that inclining the tilt angle to the viewer side is preferred when the gap increase rate is less than the focal length increase rate, whereas inclining the tilt angle to the opposite side of the viewer is preferred when the gap increase rate is greater than the focal length increase rate.

Optimizing the direction to which the tilt angle is inclined by using numerical formulas and substituting concrete values will now be described. As regards the tilt angle, the tilt angle may not be inclined any angle. Since it is desirable that the three-dimensional image is viewed normally from the vertical front, it is desirable to set the upper limit of the tilt angle to within 10 degrees.

A first example of the present embodiment will now be described.

First Example

It is now supposed that the three-dimensional image display apparatus is viewed without degradation with the depression angle $\theta_{vert}$ being in the range between an upper limit value $\theta_u$ (for example, 90 degrees) and a lower limit value $\theta_l$ (for example, 50 degrees). Therefore, it is supposed that the following relation is satisfied.

$$\theta_l < \theta_{vert} < \theta_u \quad (11)$$

Figure 6:
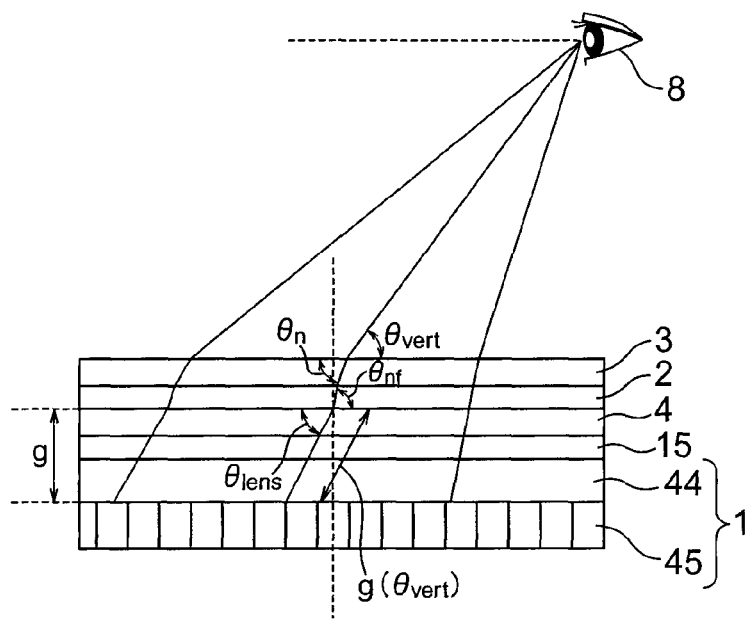
FIG. 6 is a diagram showing a light ray locus in a stereoscopic image display apparatus placed in the horizontal direction.

Description will be continued with reference to FIG. 6. An angle formed by a line which couples the viewer 8 to a center of the stereoscopic image display apparatus and a display face is denoted by $\theta_{vert}$. Denoting a lower lens face by 4, the retardation film which corrects the polarization direction by 15, a glass substrate of the liquid crystal display device by 44 and an elemental pixel group which displays an elemental image by 45, an average refractive index between the double refractive material 2 and the elemental pixel group 45 with ratios among respective lengths taken into consideration is denoted by $n_{lens}$, and an angle formed by the light ray in a substrate formed of the transparent substrate 4, the retardation film 15 and the upper substrate 45 of the liquid crystal display device with the display face is denoted by $\theta_{lens}$.

Denoting in FIG. 6 a refractive index and a gap of the transparent substrate 4 respectively by $n_4$ and $g_4$, a refractive index and a gap of the retardation film 15 respectively by $n_{15}$ and $g_{15}$, and a refractive index and a gap of the upper glass 44 of the liquid crystal display device respectively by $n_{44}$ and $g_{44}$, the following expression holds true as regards the average value $n_{lens}$ with an optical path length taken into consideration.

$$n_{lens} \times (g_4 + g_{15} + g_{44}) = n_4 \times g_4 + n_{15} \times g_{15} + n_{44} \times g_{44}$$

From FIG. 6 and the Snell's law, the following expressions are obtained.

$$\sin(90 - \theta_{nf}) \times N(\theta_{real}) = \sin(90 - \theta_{lenz}) \times n_{lens} \cos \theta_{lenz} = \cos \theta_n \times N(\theta_{real})/n_{lens} \quad (12)$$

From the expression (7), the following expression is obtained.

$$\cos \theta_{lenz} = \cos \theta_n \times n/n_{lens} = \cos \theta_{vert}/n_{lens} \quad (13)$$

It is appreciated that $\theta_{lens}$ at the lens face becomes an angle greater than the actual $\theta_{vert}$.

From the expression (13), the following expression is obtained.

$$\theta_{lenz} = \arccos(\cos \theta_{vert}/n_{lens}) \quad (14)$$

Denoting a distance between the two-dimensional display device 1 and the double refractive material 2 in FIG. 6 by g, the actual optical gap $g(\theta_{vert})$ is represented by the following expression (15).

$$g(\theta_{vert}) = g/\sin \theta_{lenz} = g/\sin \{ \arccos(\cos \theta_{vert}/n_{lens}) \} \quad (15)$$

Figure 7:
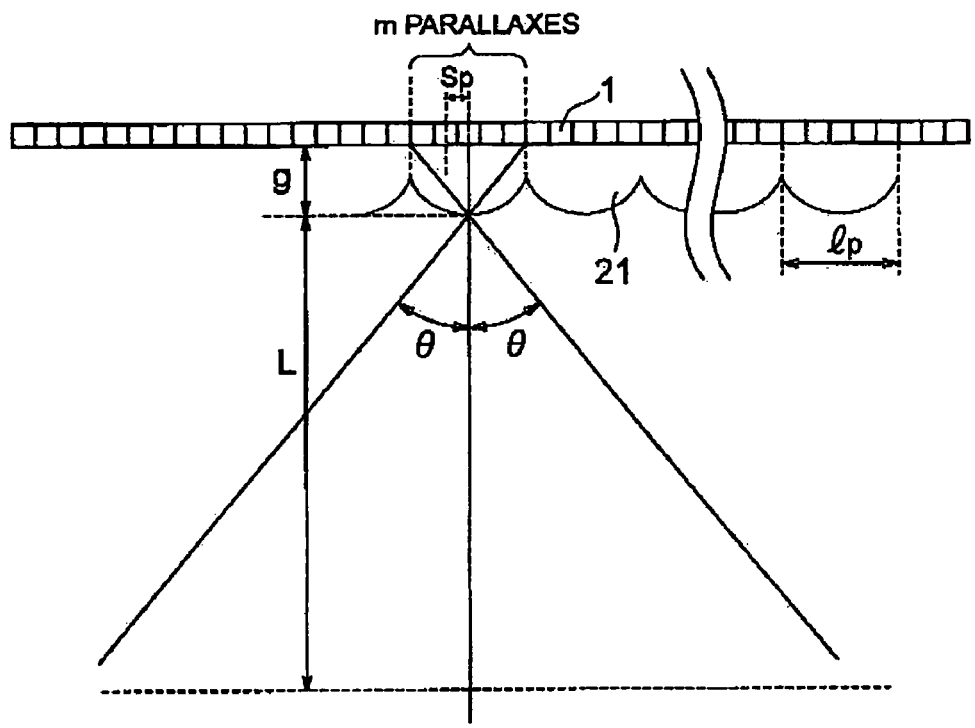
FIG. 7 is a diagram showing a relation between a viewing angle in the horizontal direction at a depression angle of 90 degrees and a gap between a lens and a plane display device.

FIG. 7 shows relations among the gap g in the three-dimensional image display apparatus, a viewing angle $2\theta$, a number of parallaxes m, a sub-pixel pitch $s_p$, and a refractive index of a lens 21, i.e., an average refractive index $n_{lens}$ with respective optical path lengths between a surface of the lens 21 and the elemental image group 45 taken into consideration. The following expressions are obtained.

$$\tan \theta = s_p \times m/(2g \times n_{lens}) g = (s_p \times m)/(2n_{lens} \times \tan \theta) \quad (16)$$

From the expressions (15) and (16), the following expression is obtained.

$$g(\theta_{vert}) = \frac{s_p m}{2 \tan \theta \times n_{lens} \times \sin\{\arccos(\cos \theta_{vert}/n_{lens})\}} < 1.05 \quad (17)$$

Considering that the maximum primary axis of the double refractive material 2 in the lens 21 is inclined by $\theta_{tilt}$ in a direction opposed to the viewer 8, an angle $\theta_{real}$ of actual inclination of an incident light ray with respect to the maximum primary axis in the lens having the double refractive material 2 is found.

$$\theta_{real} = \theta_{nf} + \theta_{tilt} = \arccos \{ \cos \theta_{vert}/N(\theta_{real}) \} + \theta_{tilt}$$

$N(\theta_{real})$ is an unknown quantity and difficult to understand intuitively. In a depression angle direction of ±45 degrees from the front, the change is small as shown in FIG. 4 and consequently $N(\theta_{real})$ may be replaced by $N_e$.

$$\theta_{real} = \arccos \{ \cos(\theta_{vert}/N_e) \} + \theta_{tilt} \quad (18)$$

The focal length and the radius of curvature of the lens are represented by the following expressions (19) and (20). It is appreciated that the focal length and the radius of curvature of the lens are related to each other.

$$\frac{1}{f} = \frac{(N-n)}{rn} \left( 2 - \frac{(N-n)d}{Nr} \right) \quad (19)$$

$$d = \frac{Nr}{(N-n)} \left( 2 - \frac{rn}{f(N-n)} \right) \quad (20)$$

In other words, if r becomes small, the focal length f becomes short. If r becomes great, the focal length f becomes great. If a thickness d of the lens is determined to be a suitable thickness, the focal length can also be determined.

Figure 11:
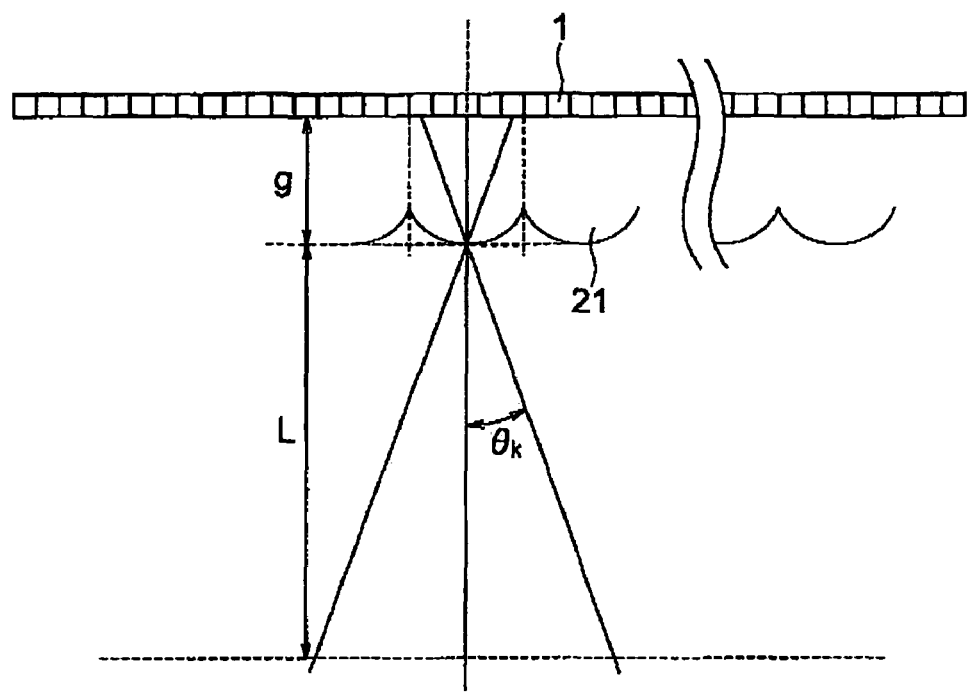
FIG. 11 is a diagram showing a relation between a viewing angle in the horizontal direction and a gap between a lens and a plane display device at a depression angle $\theta_{vert}$.

When designing the stereoscopic display apparatus, the distance g between the lens and the two-dimensional display device becomes a value which is important in determining the viewing angle $\theta_k$ as shown in FIG. 11. Values of r, n, N and d are determined so as to cause the value of the expression (19) to nearly coincide with the distance g between the lens and the two dimensional display device in order to cause the focal length of the lens to nearly coincide with the distance g between the lens and the two dimensional display device.

Supposing that f and N in the expression (19) are variables of $\theta_{real}$, therefore, the following expressions are obtained.

$$\frac{1}{f(\theta_{real})} = \frac{(N(\theta_{real}) - n)}{rn} \left( 2 - \frac{(N(\theta_{real}) - n)d}{N(\theta_{real})r} \right)$$

$$= \frac{(N(\theta_{real}) - n)}{rn} \left( \frac{2 \times N(\theta_{real})r - (N(\theta_{real}) - n)d}{N(\theta_{real})r} \right)$$

$$f(\theta_{real}) = \frac{nr^2 N(\theta_{real})}{(N(\theta_{real}) - n)(2N(\theta_{real})r - (N(\theta_{real}) - n)d)} \quad (21)$$

$$d(\theta_{real}) = \frac{N(\theta_{real})r}{(N(\theta_{real}) - n)} \left( 2 - \frac{rn}{f(N(\theta_{real}) - n)} \right) \quad (22)$$

In the foregoing description, the relation between $\theta_{vert}$ and $\theta_{real}$ is determined uniquely by the expression (18).

When $\theta_{real} = 90$ degrees, it follows that $N(\theta_{real}) = N_e$. If the curvature r and the thickness d of the lens are determined so as to cause the focal length to coincide with the distance g between the lens array and the elemental image at the front ($\theta_{vert} = 90$ degrees) of the stereoscopic image display apparatus, a favorable three-dimensional image with little crosstalk can be obtained at a position where the viewer watches the stereoscopic image display apparatus nearly at the front.

Hereafter, the focal length f (90 degrees) at the front and the distance g (90 degrees) between the lens array and the elemental image are represented by numerical formulas.

$$f(90 \text{ deg}) = \frac{nr^2 N(90 \text{ deg} - \theta_{tilt})}{(N(90 \text{ deg} - \theta_{tilt}) - n)} (2N(90 \text{ deg} - \theta_{tilt})r - (N(90 \text{ deg} - \theta_{tilt}) - n)d)$$

$$g(90 \text{ deg}) = \frac{sp \times m}{2 \times n_{lens} \times \tan \theta}$$

$$f(90 \text{ deg}) = g(90 \text{ deg}) \quad (23)$$

In other words, a curvature r1 of the lens is determined in design in a position where the viewer watches at the front of the display. If the tilt angle $\theta_{tilt}$ is 0 degree at that time, then it is appreciated from the expression (23) that a light ray having a polarization axis in the director direction of the liquid crystal passes through a medium having a refractive index $N_e$ in the liquid crystal. If the tilt angle $\theta_{tilt}$ is inclined by several degrees, however, then a light ray is incident with an inclination of $\theta_{tilt}$ in the director direction of the liquid crystal, and consequently a light ray having a polarization axis in the director direction of the liquid crystal passes through a medium having a refractive index less than $N_e$. When determining the curvature r of the lens and the thickness d of the lens, the refractive index at the front of the stereoscopic image display apparatus is given by the following expression based on the expression (6).

$$N(90 - \theta_{tilt}) = \frac{N_e N_o}{\sqrt{N_e^2 \sin^2(90 - \theta_{tilt}) + N_o^2 \cos^2(90 - \theta_{tilt})}}$$

The lens curvature r1 may be determined from the expressions (21) and (22). At this time, the refractive index n of the outside of the lens may be determined to be the same value as $N_o$. The refractive index of the uniaxial substance is determined to be $N(\theta_{real}=90-\theta_{tilt})$.

Finally, $g(\theta_{real})$ and $f(\theta_{real})$ are found considering the concrete substance having double refractive indexes, the refractive indexes of the outside lens array and the inside substrate, the refractive indexes of the glass substrate and the sheet polarizer included in the rear liquid crystal display, and the refractive index of the retardation film. As for the shape of the lens, a convexo-convex lens structure as shown in FIG. 16 is supposed.

Figure 16:
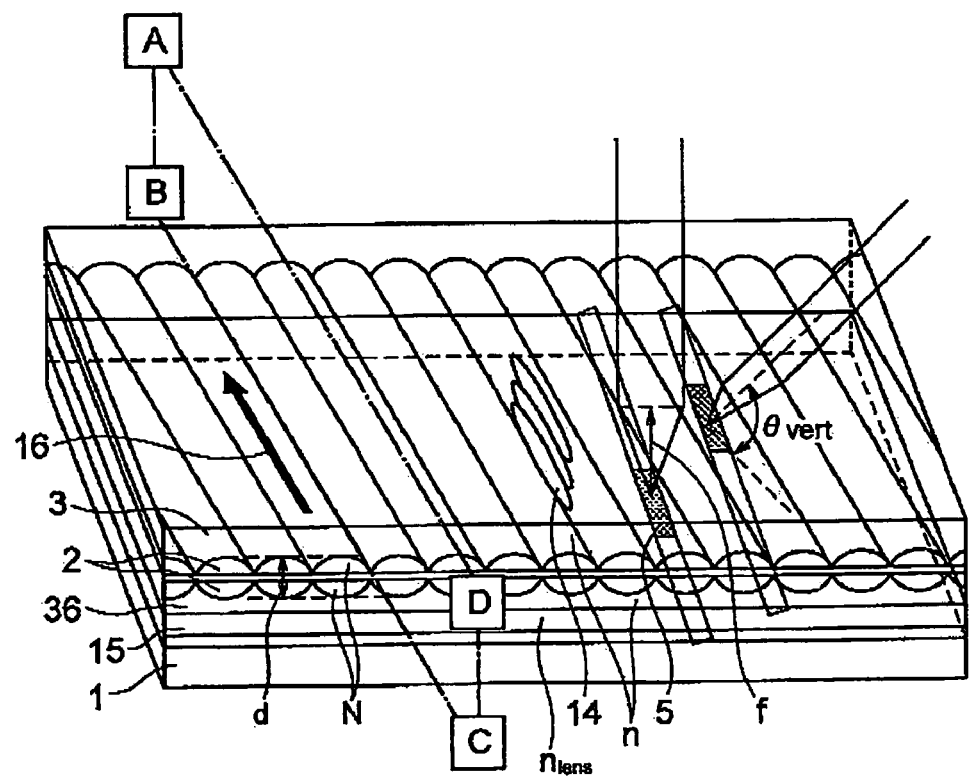
FIG. 16 is an oblique view showing a different stereoscopic image display apparatus according to the first embodiment of the present invention.

As shown in FIG. 16, the thickness d of the convexo-convex lens is a thickness between tops of the convex faces of the convexo-convex lens. As shown in FIG. 16, the focal length f is a distance from a center position between the tops of the convex faces and a converging point of light rays at the time when parallel rays are incident. As shown in FIG. 16, N is a refractive index of the medium 2 located inside the convexo-convex lens, and n is a refractive index of a medium located outside the convexo-convex lens, i.e., a refractive index of a lens array side medium 3 located on the viewer side and a lens array side medium 36 located on the two-dimensional display device side. As regards the convexo-convex lens, there is a radius of curvature in both lenses located outside and inside. Supposing that both radii of curvature are the same in absolute value, they are denoted by r. The focal length f of the convexo-convex lens is represented by the expressions (19) and (20) described above.

Figure 8:
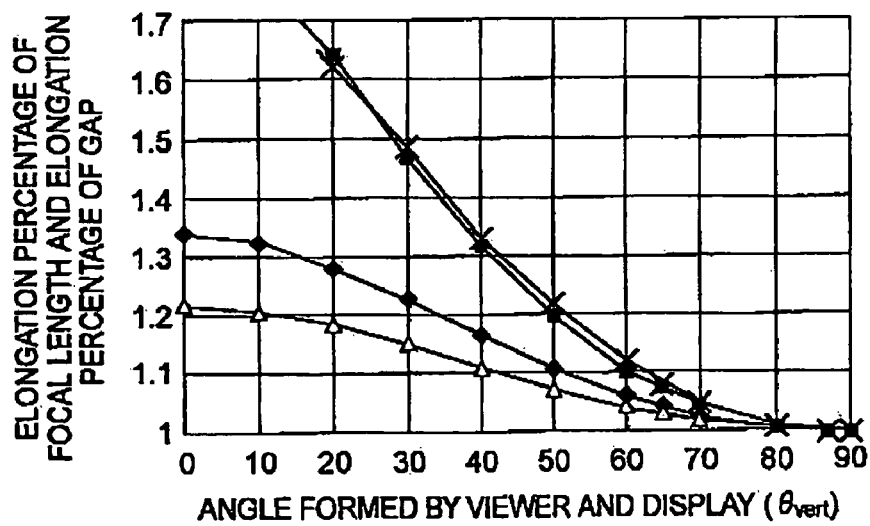
FIG. 8 is a diagram showing dependence of an elongation percentage of a focal length of a lens formed of a double refractive material and an elongation percentage of a gap caused by an average refractive index of the gap upon a depression angle.

FIG. 8 shows an elongation percentage of the focal length $f(\theta_{vert})$ obtained when the tilt angle $\theta_{tilt}$ is 0 degree, i.e., the liquid crystal molecule is not inclined and $\theta_{vert}$ is changed from 0 to 90 degrees. Normalization is conducted by using a focal length obtained when $\theta_{vert}$ is 90 degrees. Subsequently, an elongation percentage of a gap $g(\theta_{vert})$ between the lens face and an elemental image of the rear liquid crystal display obtained when $\theta_{vert}$ is changed from 0 to 90 degrees is shown. At this time, 1.2, 1.53 (a refractive index of glass) and 1.8 are used as an average value of the refractive index of the gap part between the lens array and the elemental image.

As appreciated from FIG. 8, the elongation percentage of the focal length and the elongation percentage of the gap coincide with each other when the average value of the refractive index of the gap part is 1.2. In typical transparent bodies, however, materials having the refractive index of 1.2 hardly exist. Although, for example, the material having the refractive index of 1.2 can be constituted by the air and glass having some ratio, there is a problem that the structure is restricted.

Subsequently, it is attempted to make the elongation percentage of the focal length and the elongation percentage of the gap coincide with each other in some range by changing the tilt angle $\theta_{tilt}$ of the liquid crystal display. As the average value of the refractive index in the gap part at this time, a typical refractive index 1.53 of the glass substrate used as the substrate of the liquid crystal display is used.

Figure 9:
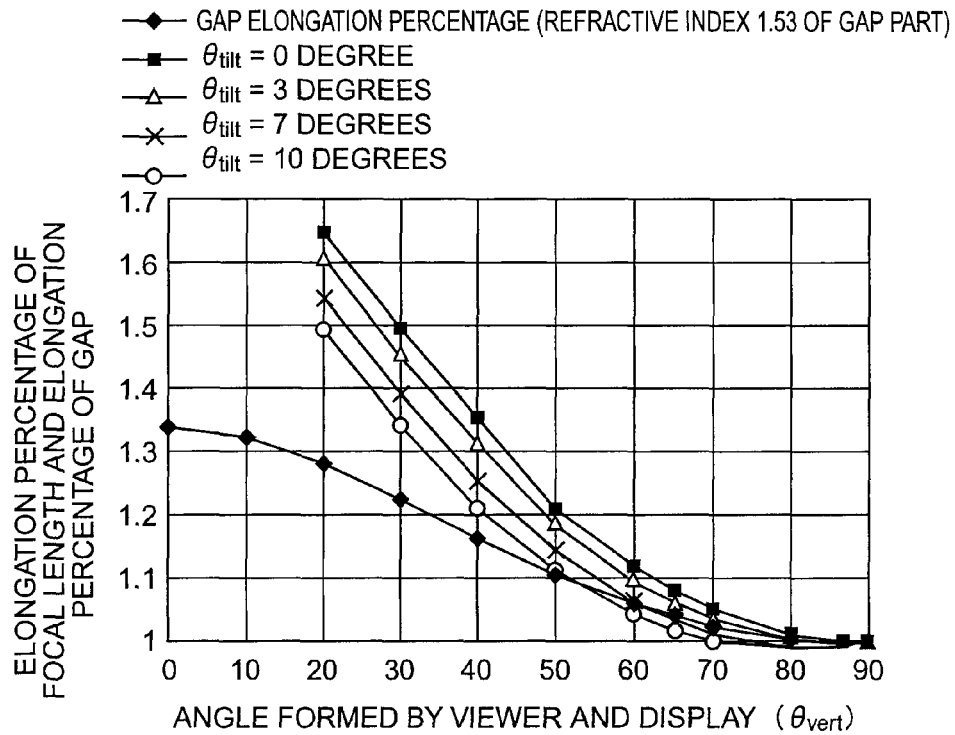
FIG. 9 is a diagram showing dependence of an elongation percentage of a focal length of a lens formed of a double refractive material caused by a tilt angle and an elongation percentage of a gap upon a depression angle.

As appreciated from FIG. 9, the elongation percentage of the focal length is higher than the elongation percentage of the gap at a tilt angle $\theta_{tilt}$ of 3 degrees. The elongation percentage of the gap coincides with the elongation percentage of the focal length at a tilt angle $\theta_{tilt}$ in the range of 7 to 10 degrees.

Figure 10:
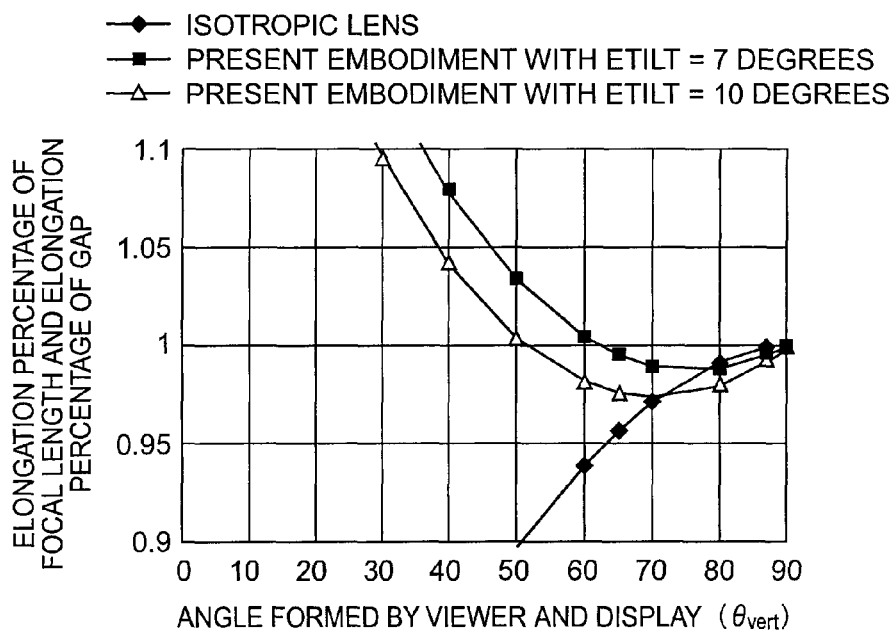
FIG. 10 is a diagram showing dependence of an elongation percentage of a focal length and an elongation percentage of a gap upon a depression angle.

FIG. 10 shows dependence of the ratio of the elongation percentage of the focal length to the elongation percentage of the gap upon $\theta_{vert}$. If it is desired to make the focal length and the gap coincide with each other with the ratio of the elongation percentage of the focal length to the elongation percentage of the gap being within 4% and with $\theta_{vert}$ in the range of 50 to 90 degrees, 7 degrees should be selected as the tilt angle $\theta_{tilt}$. If it is desired to make the focal length and the gap coincide with each other with the ratio of the elongation percentage of the focal length to the elongation percentage of the gap being within 5% and with $\theta_{vert}$ in the range of 40 to 90 degrees, 10 degrees should be selected as the tilt angle $\theta_{tilt}$.

If an isotropic lens is used in FIG. 8 for the purpose of comparison, then the focal length is constant and the gap elongates as $\theta_{vert}$ becomes small. If the gap and the focal length are made to coincident with each other at the front with $\theta_{vert}=90$ degrees, therefore, the elongation percentages differ by 5% at $\theta_{vert}=60$ degrees and the elongation percentages differ by 10% at $\theta_{vert}=50$ degrees.

As appreciated from FIG. 10, the coincidence between the focal length of the lens and the distance from the lens surface to the elemental image group in the optical path length viewed by the viewer is higher in the case where the uniaxial double refractive material is used and the major axis direction is inclined in a direction opposed to the viewer even if the viewing angle in the vertical direction deviates from 90 degrees as compared with the case where the isotropic lens is used.

If a typical double refractive material is used as heretofore described, the refractive index becomes 1.6 in polycarbonate, and becomes 1.5 to 1.7 in liquid crystal, and $\Delta n$ becomes 0.1 to 0.2. If glass is selected as the substance which forms the gap between the lens array and the elemental image, the refractive index becomes approximately 1.53. It is appreciated that the elongation percentage of the focal length caused by the double refraction becomes greater than the elongation percentage of the gap as the depression angle confronting a stereoscopic image becomes smaller in the above-described typical inexpensive stereoscopic display apparatus. For expanding the viewing angle in the ridgeline direction of the lens, therefore, it is desirable to incline the tilt angle of the maximum primary axis of the double refractive material so as to face the viewer as in the first embodiment.

Second Example

A second example of the present invention will now be described. General conditions are found by using numerical formulas in the first example. The convexo-convex lens as shown in FIG. 16 is supposed.

$$f(\theta_{vert})/g(\theta_{vert}) = \frac{nr^2 N(\theta_{real}) \sin\{\arccos(\cos\theta_{vert}/n_{lens})\}}{(N(\theta_{real})-n)(2N(\theta_{real})r-(N(\theta_{real})-n)d)g} \quad (24)$$

$$0.95 < f(\theta_{vert})/g(\theta_{vert}) < 1.05 \quad (25)$$

The expressions (24) and (25) are attained by satisfying the following expressions.

$$0.95 < \frac{nr^2 N(\theta_{real})\sin\{\arccos(\cos\theta_{vert}/n_{lens})\}}{(N(\theta_{real})-n)(2N(\theta_{real})r-(N(\theta_{real})-n)d)g} < 1.05 \quad (26)$$

$$\theta_{real} = \arccos(\cos\theta_{vert}/N_e) + \theta_{tilt}$$

By substituting the expression (16) into the expression (26), the following expression is obtained.

$$0.95 < \quad (27)$$

$$\frac{2nr^2 N(\theta_{real})\sin\{\arccos(\cos\theta_{vert}/n_{lens})\}\tan\theta \times n_{lens}}{(N(\theta_{real})-n)(2N(\theta_{real})r-(N(\theta_{real})-n)d)s_p m} < 1.05$$

Therefore, the tilt angle $\theta_{tilt}$ should be selected so as to satisfy the expression (27) with respect to $\theta_{vert}$ ($\theta_l < \theta_{vert} < \theta_u$).

Third Example

A third example of the present invention will now be described. General conditions are found by using numerical formulas in the first example. The plano-convex lens as shown in FIG. 1 is supposed. In FIG. 1, the refractive index of the inside medium of the plano-convex lens is denoted by $N(\theta_{real})$, the refractive index of the outside medium is denoted by n, and the radius of curvature of the plano-convex lens is denoted by $r_1$.

$$\frac{1}{f(\theta_{real})} = \frac{(N(\theta_{real})-n)}{r_1 n}$$

$$f(\theta_{real}) = \frac{nr_1}{(N(\theta_{real})-n)} \quad (28)$$

The focal length f which is the function of $\theta_{real}$ is rewritten as a function of $\theta_{vert}$ is by using the expressions (28) and (17). Conditions for satisfying the expression (25) are found as represented by the following expressions.

$$0.95 < \frac{2nr_1 \sin\{\arccos(\cos\theta_{vert}/n_{lens})\}\tan\theta \times n_{lens}}{(N(\theta_{real})-n)s_p m} < 1.05 \quad (29)$$

$$\theta_{real} = \arccos(\cos\theta_{vert}/N_e) + \theta_{tilt}$$

Fourth Example

A fourth example of the present embodiment will be described. Heretofore, expansion of the viewing angle in a plane parallel to the ridgeline direction of the lens has been described. In other words, the object is to make the elongation percentage of the gap and the elongation percentage of the focal length coincide with each other in order to expand the viewing angle in the vertical direction of the stereoscopic image display apparatus. On the other hand, since the focal length changes, the viewing angle in the horizontal direction of the stereoscopic image display apparatus also changes. A countermeasure method against them will now be described.

For example, as appreciated from FIG. 9, the elongation percentage of the gap between the lens and the elemental image becomes 1.1 times when $\theta_{vert}$ changes from 90 degrees to 50 degrees. Comparing FIG. 7 with FIG. 11, it is appreciated that the viewing angle in the horizontal direction becomes smaller as the gap g between the lens surface and the elemental image group becomes longer.

A viewing angle $\theta_k$ obtained when the gap g increases to k times as shown in FIG. 11 is found from the expression (16).

$$\tan\theta_k/\tan\theta = gk/g = k \quad (30)$$

It is supposed that k is 1.11 in the expression (30). When the viewing angle $2\theta$ is 22 degrees, i.e., $\theta=11$ degrees and the display is viewed from a direction of depression of 55 degrees, half of the viewing angle $2\theta_k$ becomes $\theta_k=10$ degrees.

It is supposed that k is 1.11. When the viewing angle $2\theta$ is 30 degrees, i.e., $\theta=15$ degrees and the display is viewed from the direction of depression of 55 degrees, half of the viewing angle $2\theta_k$ becomes $\theta_k=13.7$ degrees. In both cases, the viewing angle becomes small. If the depression angle becomes shallow as compared with $\theta_{vert}$ of 90 degrees, then the gap between the lens face and the elemental image becomes k times and consequently the viewing angle becomes narrow.

Figure 12:
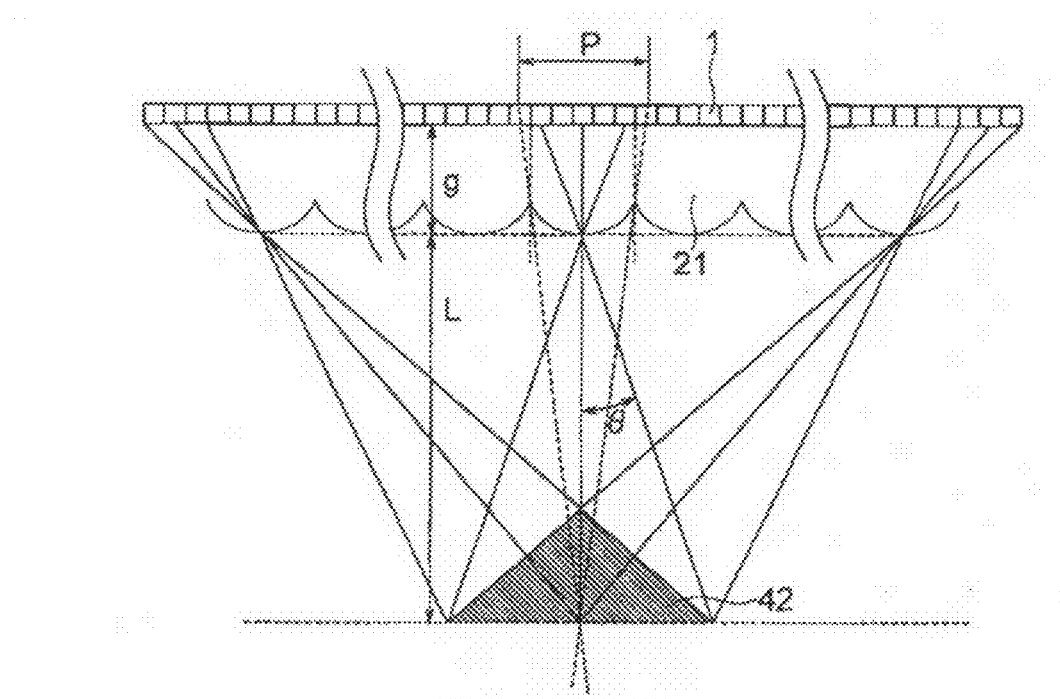
FIG. 12 is a diagram showing a viewing zone range in the horizontal direction of a stereoscopic image display apparatus at a depression angle of 90 degrees.

A problem caused by the viewing range which becomes narrow as indicated by a shaded part in FIG. 13, and a method for solving the problem will now be described. In FIG. 12, a viewing range 42 in which stereoscopic display in a plane perpendicular to the ridgeline direction of the lens can be viewed without degradation at $\theta_{vert}=90$ degrees when viewed from the front of the display is shaded.

Figure 13:
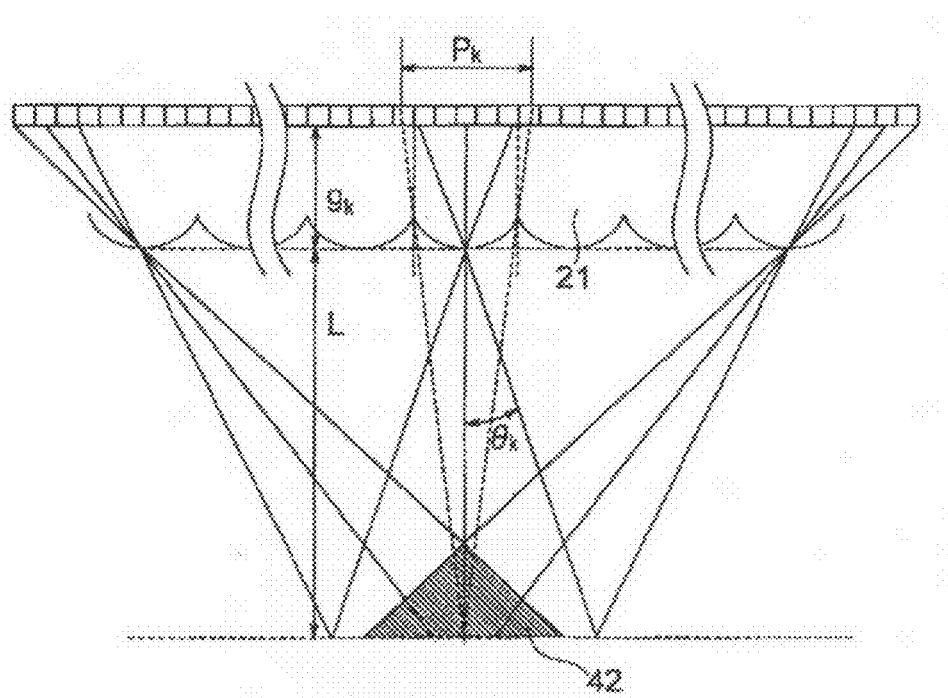
FIG. 13 is a diagram showing a viewing zone range in the horizontal direction of a stereoscopic image display apparatus at a depression angle of 50 degrees when a focal length is increased to k times.

On the other hand, it is supposed that the viewing angle $\theta$ becomes narrow as indicated by $\theta_k$ in FIG. 13. At an intersection O of a line located away from the display by a viewing distance L and a line obtained by drawing a perpendicular from the center of the display, a center position of an elemental image in a light ray locus drawn from the viewer toward a lens center located at the leftmost end of the stereoscopic image display apparatus deviates to the left side by the elongation amount of the gap. In the rightmost lens in the stereoscopic image display apparatus, the elemental image center deviates to the right side. The viewing range 42 in which the stereoscopic display is viewed without degradation is shaded in FIG. 13. Since a quasi image is seen at both ends of the viewing range at the viewing distance obtained until now, the viewing range looks as if it has become narrower. As for the countermeasure method, it is necessary to lengthen the viewing distance at the same elemental image. If it is not desirable to change the viewing distance, it is necessary to recompose the elemental image again in the state in which the viewing angle is set equal to $\theta_k$. As for the composition method, there is a method of correcting the elemental image pitch.

Hereafter, the elemental image pitch will be described. As shown in FIG. 12, from an intersection O of a line located away from the display by a viewing distance L and a line obtained by drawing a perpendicular from the center of the display, two lines are drawn to boundaries of one arbitrary lens. A distance P between intersections of the two lines and the two-dimensional display device becomes slightly wider than m parallaxes obtained by replacing the lens pitch with the number of parallaxes.

A result obtained by replacing the distance slightly widened than the lens pitch with the number of parallaxes is referred to as elemental image pitch. If the gap is widened to k times by viewing with a shallower depression angle as shown in FIG. 13, an elemental image pitch $P_k$ becomes wider than the elemental image pitch set in FIG. 12. By correcting $P_k$ to a correct width, the reduction of the viewing range as shown in FIG. 13 caused by the narrowing of the viewing angle can be prevented and the viewing range can be maximized at the viewing distance as shown in FIG. 12.

An example of the optimum design of the elemental image pitch will now be described. For maximizing the viewing angle without any adjustment in the range of the expression (13), i.e., regardless of whether the depression angle is $\theta_u$ or $\theta_l$, the viewing angle should be determined on the average.

For example, gaps respectively of $\theta_u$ and $\theta_l$ will now be found.

$$g(\theta_{vert}) = g/\sin\{\arccos(\cos\theta_{vert}/N_e)\} \quad (31)$$

Therefore, it follows that $$g(\theta_u) = g/\sin\{\arccos(\cos\theta_u/N_e)\} \quad (32)$$

$$g(\theta_l) = g/\sin\{\arccos(\cos\theta_l/N_e)\} \quad (33)$$

$$k = g(\theta_u)/g(\theta_l) = \sin\{\arccos(\cos\theta_l/N_e)\}/\sin\{\arccos(\cos\theta_u/N_e)\}$$

From the expression (30), the following expression is obtained.

$$\tan\theta_k = \tan\theta \times k$$
$$= \tan\theta \times \sin\{\arccos(\cos\theta_l/N_e)\}/\sin\{\arccos(\cos\theta_u/N_e)\}$$

If it is attempted to adapt to $\theta_{middle}$ which is a middle value of $\tan\theta_k$ and $\tan\theta$, the following expression is obtained.

$$\tan\theta_{middle} = \tan\theta_k/2$$
$$= \tan\theta \times (\sin\{\arccos(\cos\theta_l/N_e)\}/(2\sin\{\arccos(\cos\theta_u/N_e)\}))$$

The elemental image pitch should be set at the above-described $\tan\theta_{middle}$.

According to the present embodiment, the focal length of the lens can be changed according to a change of the distance between the lens and the plane display device caused by the depression angle, by using the double refraction lens and inclining the maximum primary axis direction of double refraction to a direction opposed to the viewer, as heretofore described. Even if the distance between the lens and the plane display device becomes great and it does not match the focal length of the lens, it is possible to prevent the viewing angle at which a favorable three-dimensional image can be viewed from becoming small.

Second Embodiment

Figure 14:
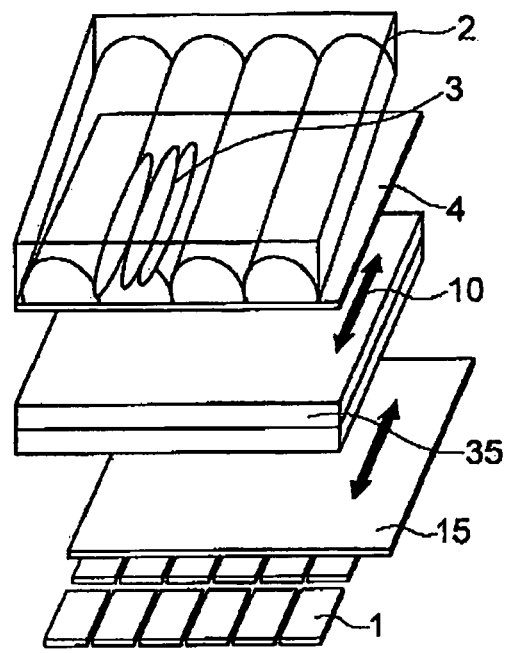
FIG. 14 is an oblique view showing a state of three-dimensional image display in a stereoscopic image display apparatus according to a second embodiment of the present invention.
Figure 15:
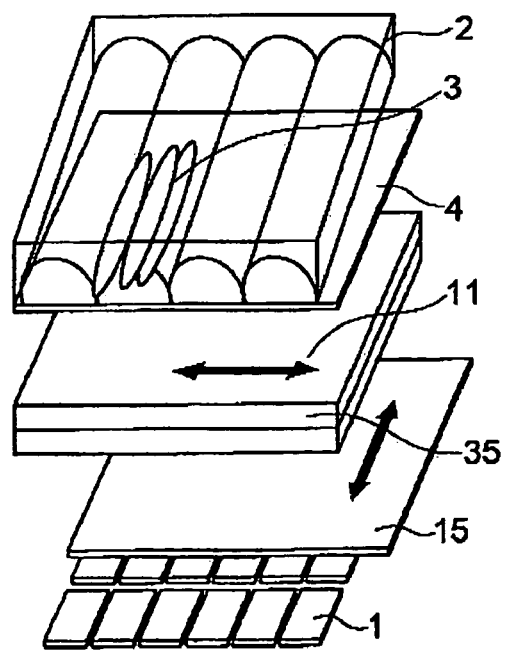
FIG. 15 is an oblique view showing a state of two-dimensional image display in a stereoscopic image display apparatus according to the second embodiment of the present invention.

A second embodiment of the present invention will now be described. The double refraction lens has a feature that the refractive index (extraordinary ray component) of the maximum primary axis differs from the refractive index (ordinary ray component) in a plane perpendicular to the primary axis. As shown in FIG. 14 for the three-dimensional display mode and FIG. 15 for the two-dimensional display mode, it is possible to separate light rays into an ordinary ray component and an extraordinary ray component if the polarization direction is controlled by using a device 35 which changes over the polarization direction of a light ray passed through the retardation film 15 in the plane display device 1 to the direction of the maximum primary axis or a minor axis direction 11 perpendicular to the maximum primary axis. In other words, if a light ray having a polarization plane horizontal to the major axis direction 10 of the liquid crystal molecule is incident, then the refractive index $N_e$ of the extraordinary ray component appears and consequently the light is refracted at the boundary plane and incident. On the other hand, if a light ray having a polarization plane in a plane perpendicular to the major axis 10 of the liquid crystal is incident, then the refractive index $N_o$ of the ordinary ray component appears and consequently the light is not refracted at the boundary plane and goes straight on. As a result, it becomes possible to conduct two-dimensional image/three-dimensional image changeover by using the liquid crystal lens.

In the present embodiment as well, the focal length of the lens can be changed according to a change of the distance between the lens and the plane display device caused by the depression angle, by using the double refraction lens and inclining the maximum primary axis direction of double refraction to a direction opposed to the viewer, in the same way as the first embodiment. Even if the distance between the lens and the plane display device becomes great and it does not match the focal length of the lens, it is possible to prevent the viewing angle at which a favorable three-dimensional image can be viewed from becoming small.

In the first and second embodiments, a liquid crystal display is taken as an example of the rear display. However, similar effects are obtained in a plane display such as an organic EL display, an FED or a SED as well by inserting a sheet polarizer somewhere between the double refraction lens and the elemental image.

According to the embodiments of the present invention, the focal length of the lens can be changed according to a change of the distance between the lens and the plane display device caused by the depression angle, by using the double refraction lens and inclining the maximum primary axis direction of double refraction to a direction opposed to the viewer as heretofore described. As a result, a viewing angle at which a favorable three-dimensional image can be viewed can be expanded.

According to the present embodiment, it is possible to prevent the stereoscopic display from being degraded even if the depression angle in the vertical direction in the stereoscopic display apparatus, in other words, an angle at which the stereoscopic display apparatus is viewed in the ridgeline direction of the lens array becomes shallow. In other words, even if the locus of the light ray between the lens and the two-dimensional display device becomes long, the elongation percentage of the focal length of the lens can be adapted according to the elongation percentage of the locus of the light ray between the lens and the two-dimensional display device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A stereoscopic image display apparatus, comprising:
   a plane display device having a display face formed of a plurality of pixels arranged in a matrix form;
   an optical plate comprising a plurality of lenses which are arranged in front of the display face of the plane display device and which have a uniaxial double refractive material inserted therein, and controlling light rays from the pixels; and a sheet polarizer provided between the plane display device and the optical plate to align a polarization direction of light ray, wherein in the double refractive material, a maximum primary axis of refractive index is parallel to ridgelines of the lenses and is inclined in a direction opposed to a viewer; and wherein in each of a plurality of lenses, lens faces have opposed convex shapes in opposite directions, $2\theta$ denotes a viewing angle, $s_p$ denotes a sub-pixel pitch in a horizontal direction, m denotes a number of parallaxes in the horizontal direction, $n_{lens}$ denotes an average value of a refractive index of a medium located from a position corresponding to half of a length between tops of the convexo-convex lenses to the plane display device, r denotes a radius of curvature of both faces of the lenses, d denotes a thickness of lenses between tops of the lenses, $N_e$ denotes a refractive index in a maximum primary axis direction of the double refractive material formed inside the lenses, $N_o[[(<N_e)]]$ which is less than $N_e$ denotes a refractive index in a minor axis direction perpendicular to the maximum primary axis direction, n denotes a refractive index of an isotropic substance formed outside the lens faces of the lenses, $\theta_{vert}$ denotes a depression angle of a viewer with respect to a direction of the ridgeline of the lenses, $\theta_{tilt}$ denotes an angle of inclination of the maximum primary axis direction to a direction opposed to the viewer, and $\theta_{real}$ denotes an angle formed by a light ray which passes through the double refractive material and the maximum primary axis direction, and $\theta_{real}$ is represented by the following expression $$\theta_{real} = \arccos(\cos\theta_{vert}/N_e) + \theta_{tilt}$$

and if a refractive index obtained when the light ray has passed through the double refractive material is represented by the following expression, $$N(\theta_{real}) = \frac{N_e N_o}{\sqrt{N_e^2 \sin^2\theta_{real} + N_o^2 \cos^2\theta_{real}}}$$

the angle $\theta_{tilt}$ satisfies the following condition $$0.95 < \frac{2nr^2 N(\theta_{real})\sin(\arccos(\cos\theta_{vert}/n)\tan\theta}{(N(\theta_{real})-n)(2N(\theta_{real})r - (N(\theta_{real})-n)d)s_p m} < 1.05.$$

2. The apparatus according to claim 1, wherein an angle $\theta_{tilt}$ by which the maximum primary axis direction of a molecule of the double refractive material is inclined to a direction opposed to the viewer is in a range of 7 to 10 degrees.

3. The apparatus according to claim 1, wherein in the polarizer sheet, the polarization direction of the light ray is caused to coincide with the maximum primary axis of the refractive index of the double refractive material.

4. The apparatus according to claim 1, further comprising a device which changes the polarization direction so as to display a three-dimensional image when the polarization direction is matched with the maximum primary axis and display a two-dimensional image when the polarization direction is matched with a direction perpendicular to the maximum primary axis.

5. A stereoscopic image display apparatus, comprising:

a plane display device having a display face formed of a plurality of pixels arranged in a matrix form;

an optical plate comprising a plurality of lenses which are arranged in front of the display face of the plane display device and which have a uniaxial double refractive material inserted therein, and controlling light rays from the pixels; and a sheet polarizer provided between the plane display device and the optical plate to align a polarization direction of light ray, wherein in the double refractive material, a maximum primary axis of refractive index is parallel to ridgelines of the lenses and is inclined in a direction opposed to a viewer; and wherein in each of a plurality of lenses, one of lens faces has a convex shape on the viewer's side or has a convex shape on an opposite side of the viewer, $2\theta$ denotes a viewing angle, $s_p$ denotes a sub-pixel pitch in a horizontal direction, m denotes a number of parallaxes in the horizontal direction, $n_{lens}$ denotes an average value of a refractive index of a medium located between a plane in contact with both ends of the lenses and the plane display device, $r_1$ denotes a radius of curvature of the lenses, d denotes a thickness of lenses, $N_e$ denotes a refractive index in the maximum primary axis direction of the double refractive material formed inside the lenses in a range from a surface of each of lenses to a plane in contact with both ends of each lens, $N_o[[(<N_e)]]$ which is less than $N_e$ denotes a refractive index in a minor axis direction perpendicular to the maximum primary axis direction, n denotes a refractive index of an isotropic substance in contact with lens side of the lenses, $\theta_{vert}$ denotes a depression angle of a viewer with respect to a direction of the ridgeline of the lenses, $\theta_{tilt}$ denotes an angle of inclination of the maximum primary axis direction to a direction opposed to the viewer, $\theta_{real}$ denotes an angle formed by a light ray which passes through the double refractive material and the maximum primary axis direction, $\theta_{real}$ is represented by the following expression $$\theta_{real} = \arccos(\cos\theta_{vert}/N_e) + \theta_{tilt}$$

and if a refractive index obtained when the light ray has passed through the double refractive material is represented by the following expression, $$N(\theta_{real}) = \frac{N_e N_o}{\sqrt{N_e^2 \sin^2\theta_{real} + N_o^2 \cos^2\theta_{real}}}$$

the angle $\theta_{tilt}$ satisfies the following condition $$0.95 < \frac{2nr^2 N(\theta_{real})\sin(\arccos(\cos\theta_{vert}/n)\tan\theta}{(N(\theta_{real})-n)(2N(\theta_{real})r - (N(\theta_{real})-n)d)s_p m} < 1.05.$$

6. The apparatus according to claim 5, wherein an angle $\theta_{tilt}$ by which the maximum primary axis direction of a molecule of the double refractive material is inclined to a direction opposed to the viewer is in a range of 7 to 10 degrees.

7. The apparatus according to claim 5, wherein in the polarizer sheet, the polarization direction is caused to coincide with the maximum primary axis of the refractive index of the double refractive material.

8. The apparatus according to claim 5, further comprising a device which changes the polarization direction so as to display a three-dimensional image when the polarization direction is matched with the maximum primary axis and display a two-dimensional image when the polarization direction is matched with a direction perpendicular to the maximum primary axis.

* * * * *